Nov. 4, 1969 B. E. RESENER 3,476,227
FLEXIBLE COUPLING DEVICE
Filed Sept. 28, 1967 2 Sheets-Sheet 1
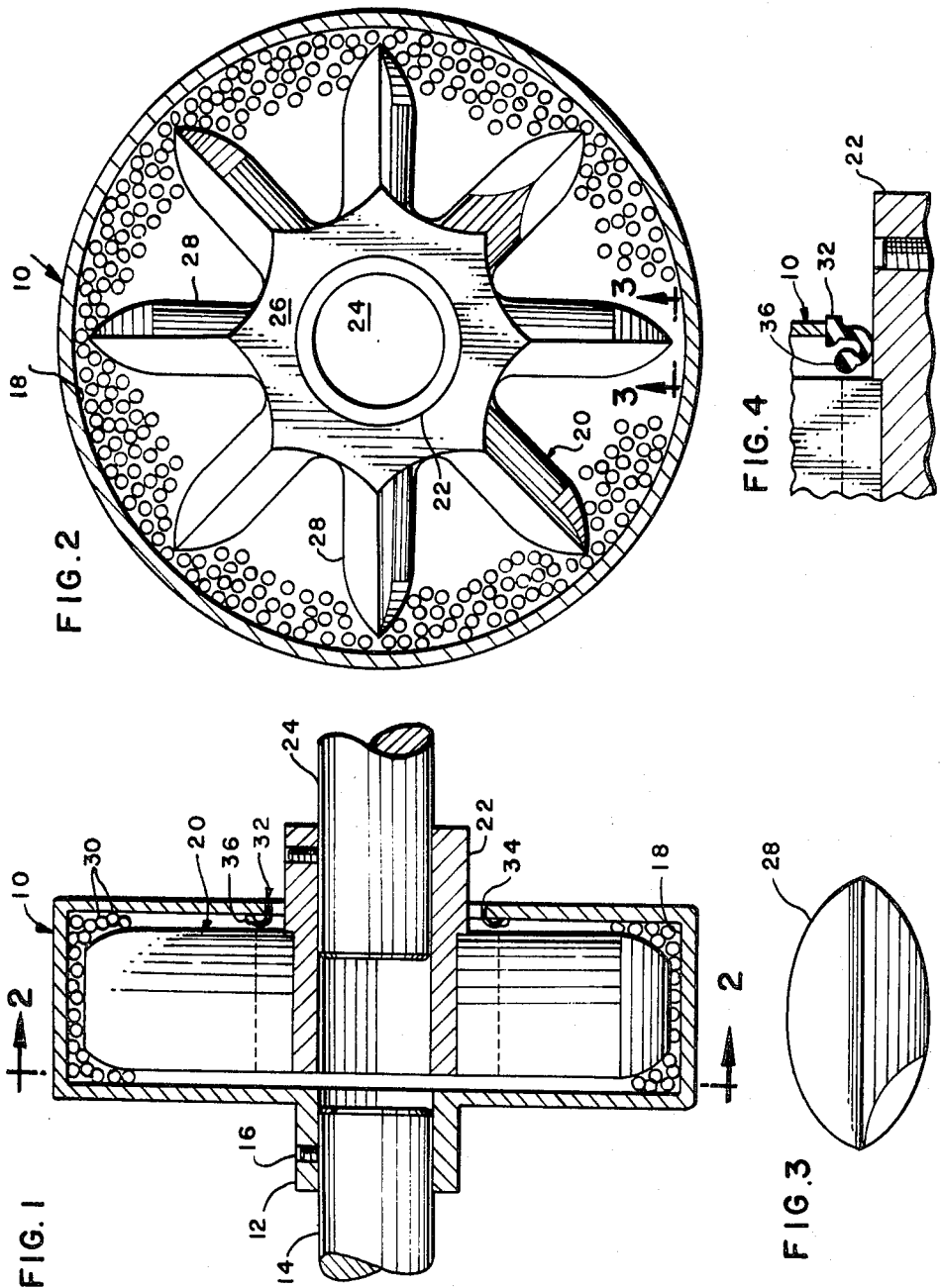
INVENTOR.
BAIRD E. RESENER
BY
ATT'YS Nov. 4, 1969   B. E. RESENER   3,476,227
FLEXIBLE COUPLING DEVICE
Filed Sept. 28, 1967   2 Sheets-Sheet 2

INVENTOR.
BAIRD E. RESENER
BY
ATT'YS

United States Patent Office 3,476,227
Patented Nov. 4, 1969

3,476,227
FLEXIBLE COUPLING DEVICE
Baird E. Resener, Indianapolis, Ind., assignor to Amsted Industries Incorporated, Chicago, Ill., a corporation of New Jersey
Filed Sept. 28, 1967, Ser. No. 671,275
Int. Cl. F16d *43/14, 23/10*
U.S. Cl. 192—105
9 Claims

ABSTRACT OF THE DISCLOSURE

A cylindrical housing is secured to the end of a drive shaft and contains dry shot or a slurry of shot and lubricant. An elastomeric rotor is positioned in the housing and attached to the driven shaft, the rotor being entirely spaced from the corresponding interior surface of the housing. A curved seal is attached around the housing to engage with the rotor, and has a bulbous mass at its free end, causing the seal to withdraw from the rotor or the hub during rotation of the device.

---

This invention relates to friction coupling devices and more particularly to centrifugal devices employing shot or other particulate matter as a torque transmitting medium.

Centrifugal friction clutches, such as those described in the Widegren Patent No. 1,887,610 and the Badin Patent No. 2,813,606, have been proposed as shaft coupling devices. Generally these devices comprise a rotor secured to one shaft, a housing secured to the other shaft and surrounding the rotor, and powdered or granular materials within the housing for transmitting torque between the rotor and housing by frictional engagement. As the housing is rotated, the particulate material is distributed evenly around the inner periphery of the device and is engaged between the housing and the rotor.

Primary operational disadvantages of centrigual friction clutches reside in their inability to compensate for axial or angular misalignment of the connected shafts. Also, in many applications, it is desirable that the coupling device be able to accommodate, and preferably dissipate, torsional vibrations of varying frequency. Another desirable feature is the ability of such devices to accommodate overloads by slippage between the rotor and the housing.

Accordingly, an object of this invention is to provide an overload shaft coupling device that will accommodate shaft misalignment and vibrations.

Another object of this invention is the provision of means in such devices for dissipating energy created due to misalignment and vibrations.

A further object of the invention is to provide a elastomeric rotor that is radially compressible inwardly upon overload so as to allow the friction coupling to slip.

Figure 5:
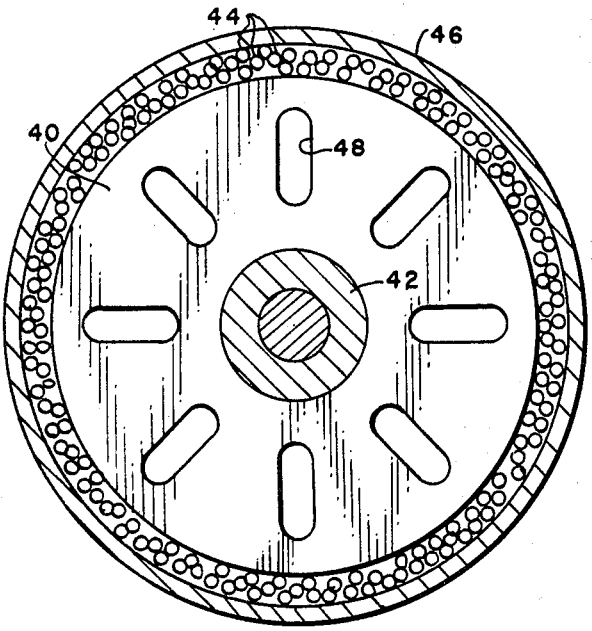
Figure 6:
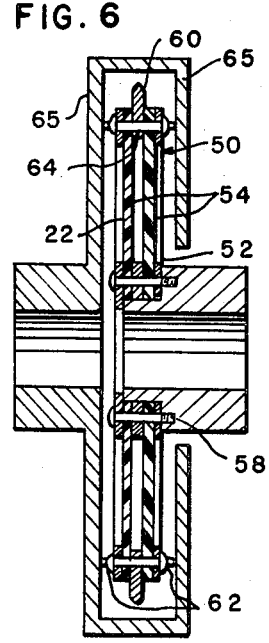
Figure 7:
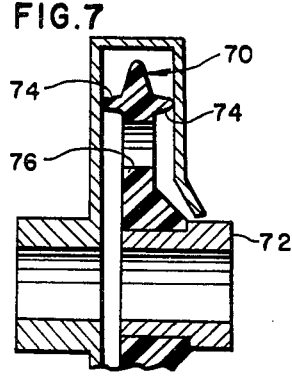
Figure 8:
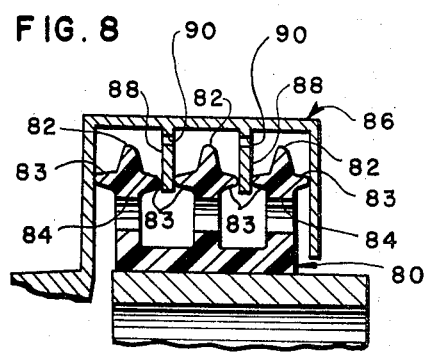

Other objections will become apparent to those skilled in the art from the following description taken in connection with the accompanying drawings wherein:

FIGURE 1 is a partial transverse cross-sectional view of the inventive device;
FIGURE 2 is a cross-sectional view along line 2—2 of FIGURE 1;
FIGURE 3 is a view taken along line 3—3 of FIGURE 2;
FIGURE 4 is a modification of the bracketed portion of FIGURE 1;
FIGURE 5 is a fragmentary elevational view in cross section, showing another embodiment of the present invention; and
FIGURES 6–8 are transverse sectional views of other embodiments of the present invention.

Referring to FIGURES 1–3, a cylindrical housing 10 is secured to a humb 12, which is in turn secured to an input or drive shaft 14 by means of a set screw 16. Housing 10 defines a cylindrical cavity 18 in which is located a rotor 20 secured to a hub 22 in turn secured to an output or driven shaft 24. The input shaft 14 and the output shaft 24 are supported and held substantially coaxial by any suitable means (not shown).

As best shown in FIGURES 2 and 3, the rotor 20 is composed of an elastomer or other resilient, non-metallic material and comprises a solid central portion 26 secured around driven shaft hub 22, along with a plurality of arms 28 of tapered cross-section extending radially outward from said central portion in a regular and equidistant manner, the ends of said arms being somewhat pointed. As shown in FIGURES 1 and 2, the ends and the sides of arms 28 are entirely spaced from the internal surfaces of housing 10, which feature contribtues to the flexibility of the device.

An amount of particulate matter, such as shot 30 of metallic or non-metallic materials is provided within housing 10. The shot 30 may be either in dry form or slurried with a liquid, such as a lubricant, to establish the required torque transmission during rotation of the device.

The device as shown in FIGURES 1 and 2 is an simulated rotation, at which time the shot 30 accumulates near the outer periphery of the cavity 18 and the rotor arms 28 due to centrifugal forces created by rotation. The housing 10 and the rotor 20 are thus caused to rotate together by the imposition of shot therebetween, and the drive and driven shafts, 14 and 24, respectively, are caused to rotate simultaneously. Angular and parallel misalignment of one shaft from a coaxial relation to the other shaft is accommodated because of the flexibility of the rotor 20 and the spaced arrangement between said rotor and the internal surfaces of the housing 10. High frequency torsional vibration is absorbed by the hysteresis loss within the elastomeric rotor 20.

The presently described device may also be designed to slip when overloaded. During an overload, the elastomeric arms 28 may partially deflect and otherwise slip through the shot 30. In the same manner, lower frequency vibrations, being of the nature of a series of brief overloads, are accommodated by the same slippage.

As best shown in FIGURE 1, a dynamic curved seal 32 is secured to the edge 34 of the housing 10 and extends away from the axis of the output shaft 24 within the cavity 18. The curved seal 32 is composed of a flexible material, such as rubber, and has a relatively heavy bulbous mass 36 at its free extremity. When the device is at rest, a curved intermediate portion of seal 32 is adapted to abut the rotor 20, in order to prevent the escape of shot 30 and lubricant. As the device is rotated, as simulated in FIGURE 1, centrifugal force causes the bulbous mass 36 to extend away from the axis of the output shaft 24, thereby causing the intermediate curved portion of the seal 32 to withdraw from the rotor 20. No seal is required during rotation, since the shot 30 and lubricant are near the outer periphery of the cavity 18.

FIGURE 4 illustrates another arrangement for utilizing the seal 32. Here, the curved intermediate portion is adapted to abut the hub 22 when the device is at rest, with the bulbous mass 36 causing withdrawal of the seal from the hub during rotation.

From the above description, it will be understood that various modifications may be made to alter the maximum torque limit of the device. For example, the size or amount of shot 30 and lubricant may be varied. Also, the keying effect of the rotor and housing relative to one another may be modified by changing their shapes and sizes.

As shown in FIGURE 5, the present invention may take the form of a disk-shaped rotor 40 bonded to the output shaft 42, with particulate matter 44 between the outer periphery of the rotor and the inner cylindrical surface of the housing 46. A plurality of openings 48 may be provided in rotor 40 for increased flexibility.

With devices similar to that shown in FIGURE 5, axial misalignment of the input and output shafts may cause the disk-shaped rotor 40 to skew within the housing 46, resulting in a congregation of particulate matter 44 on one side of the rotor. FIGURES 6-8 illustrate other embodiments designed to overcome this difficulty.

In FIGURE 6, the device is similar to that hereinbefore described (the particulate matter being omitted), except for the rotor, generally indicated at 50. In this instance the rotor 50 comprises a pair of outer metal retainer disks 52 with a pair of elastomeric disks 54 interposed therebetween, all of said disks being secured to the output hub by screws 58 or other suitable means. A ring of wear resistant material 60 is interposed between the elastomeric disks and extends axially outwardly therefrom, presenting a wear resistant surface to the particulate matter (not shown) during revolution. A plurality of protuberances or centering guides 62 are secured around both sides of the rotor 50 near the outer periphery thereof, said guides being held by pins 64 passing through the disks and the ring of wear resistant material 60 to form a unitary assembly. The guides 62 tend to maintain the rotor 50 substantially centered between the sides 65 of the housing.

A still further embodiment is shown in FIGURE 7 wherein the rotor 70 is entirely composed of a disk-shaped elastomer bonded to the output hub 72 and has a series of elastomeric protuberances 74 on both sides thereof serving as guides. A plurality of openings 76 may be provided in the rotor 70 for increased flexibility, so that upon torsional overload the rotor 70 will radially compress inwardly whereby the coupling will be allowed to slip.

The torque capacity of the device shown in FIGURE 7 may be increased by the provision of a multicavity device shown in FIGURE 8. Here, the rotor 80 comprises a series of disks 82 bearing protuberances 83 and having openings 84 therein for greater flexibility. The housing 86 has partitions 88 therein separating the disks 82, and each partition may have one or more openings 90 therein for uniform distribution of the particulate matter (not shown) within the housing.

It will be understood that other modifications may be made to the design and structure of the invention herein described without departing from the scope of the appended claims.

Having thus described the invention what is claimed is:

1. A flexible coupling device for coupling two rotatable members comprising a housing secured to the end of one rotatable member, a cylindrical cavity within said housing, a radially compressible rotor within said cavity composed of an elastomer and secured to said other rotatable member, said rotor within said cavity being normally entirely spaced from said housing and particulate means within said cavity said rotor on torsional overload being compressed radially upwardly away from said housing, thereby permitting said coupling to slip.

2. The invention according to claim 1 wherein said particulate means comprises a mass of dry shot.

3. The invention according to claim 1 wherein said particulate means comprises a mass of shot in a lubricant.

4. The invention according to claim 1 wherein dynamic seal means is provided between said housing and said rotor around said other rotatable member and secured to said housing, said dynamic seal means having a curved intermediate portion extending away from the axis of said other rotatable member at times slidably engageable with said rotor, and having a relatively heavy bulbous mass at the free extremity thereof, whereby said curved portion is withdrawn from said rotor during rotation of the device.

5. The invention according to claim 4 wherein said rotor further comprises a central portion secured around said other rotatable member and a plurality of symmetrical arms of tapered cross-section extending radially outward from said central portion, the ends of said arms being somewhat pointed.

6. The invention according to claim 1 wherein dynamic seal means is provided between said housing and said other rotatable member and is secured to said housing, said dynamic seal means having a curved intermediate portion at times slidably engageable with said other rotatable member, and having a relatively heavy bulbous mass at the free extremity thereof, whereby said curved portion is withdrawn from said other rotatable member during rotation of the device.

7. The invention according to claim 1 wherein a plurality of guide protuberances are provided on both sides of said rotor, said rotor being provided with a plurality of openings therethrough.

8. The invention according to claim 1 wherein said rotor further comprises a plurality of disk-shaped elastomeric members bearing a plurality of guide protuberances on both sides thereof, and wherein said housing further comprises partitions extending between said disk-shaped members.

9. The invention according to claim 8 wherein the partitions have openings therein.

References Cited
UNITED STATES PATENTS

| | | | |
|---|---|---|---|
| 1,848,616 | 3/1932 | Fottinger | 192—105 XR |
| 1,887,610 | 11/1932 | Widegren et al. | 192—105 XR |
| 2,478,649 | 8/1949 | Wightman | 277—25 |
| 2,719,412 | 10/1955 | Croset | 64—27 XR |
| 2,952,345 | 9/1960 | Voillot | 192—105 XR |
| 2,986,414 | 5/1961 | Heck | 277—25 |
| 3,190,422 | 6/1965 | Burckhardt | 192—105 |
| 3,326,559 | 6/1967 | Persons | 277—95 |

FOREIGN PATENTS

| | | |
|---|---|---|
| 259,551 | 7/1949 | Switzerland. |
| 637,442 | 4/1928 | France. |

MARTIN P. SCHWADRON, Primary Examiner

LESLIE J. PAYNE, Assistant Examiner

U.S. Cl. X.R.

64—27; 192—55, 56; 227—25, 95